United States Patent
Vanni et al.

(10) Patent No.: US 10,258,189 B2
(45) Date of Patent: Apr. 16, 2019

(54) GRIPPER RETENTION DEVICE FOR A CAPSULE OR THE LIKE IN A MACHINE FOR THE PREPARATION OF BEVERAGES, IN PARTICULAR ESPRESSO COFFEE

(71) Applicant: LUIGI LAVAZZA S.P.A., Turin (IT)

(72) Inventors: Alfredo Vanni, Chieri (IT); Alberto Cabilli, Moncalieri (IT); Luca Bugnano, Moncalieri (IT); Denis Rotta, Dronero (IT); Danilo Bolognese, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 858 days.

(21) Appl. No.: 14/424,589

(22) PCT Filed: Sep. 18, 2013

(86) PCT No.: PCT/IB2013/058629
§ 371 (c)(1),
(2) Date: Feb. 27, 2015

(87) PCT Pub. No.: WO2014/045205
PCT Pub. Date: Mar. 27, 2014

(65) Prior Publication Data
US 2015/0216351 A1 Aug. 6, 2015

(30) Foreign Application Priority Data

Sep. 18, 2012 (IT) ................ TO2012A0809

(51) Int. Cl.
*A47J 31/44* (2006.01)
*A47J 31/36* (2006.01)
*A47J 31/40* (2006.01)

(52) U.S. Cl.
CPC ......... *A47J 31/446* (2013.01); *A47J 31/3633* (2013.01); *A47J 31/407* (2013.01)

(58) Field of Classification Search
CPC .. A47J 31/3633; A47J 31/407; A47J 31/3676; A47J 31/3638; A47J 31/3628
(Continued)

(56) References Cited

U.S. PATENT DOCUMENTS

2009/0007794 A1* 1/2009 Cortese ............... A47J 31/3628
99/289 R
2009/0249961 A1* 10/2009 Cheng ................. A47J 31/3638
99/289 R

FOREIGN PATENT DOCUMENTS

EP 1 721 553 B1 12/2008
EP 1 886 942 B1 11/2009
(Continued)

OTHER PUBLICATIONS

International Search Report for PCT/162013/058629 dated Jan. 23, 2014 [PCT/ISA/210].

*Primary Examiner* — Phuong T Nguyen
(74) *Attorney, Agent, or Firm* — Sughrue Mion, PLLC

(57) ABSTRACT

The gripper device (100) comprises a pair of opposite movable jaws (41) having respective coordinated gripping profiles (50) intended to cooperate with corresponding predetermined portions of the lateral surface of a capsule (C) of a first predetermined type so as to define a retaining position for such a capsule (C) in which the capsule (C) is essentially coaxial with a predetermined reference direction (R-R).
The jaws (41) are able to assume a relative rest or standby position in which they are close together and inlet portions thereof (41*a*, 45) are capable of being splayed and passed beyond by a capsule (C) introduced into the machine (1), so as to allow said capsule (C) to be positioned and gripped between the gripping profiles (50) in the retaining position. Moreover, the jaws (41), adjacent to said coordinated gripping profiles (50), have respective further coordinated gripping profiles (51) able to cooperate with corresponding
(Continued)

predetermined portions of the lateral surface of a capsule (CX) of a further and different type able to be introduced into the machine as well as to splay and pass beyond the inlet portions (41a, 45) of the jaws (41). These further coordinated profiles (51) are shaped and/or arranged such that they are capable of defining, for a capsule (CX) of the further type, a corresponding retaining position in which the capsule (CX) of the further type is axially offset by a predetermined amount ($\Delta$) with respect to the predetermined reference direction (R-R).

4 Claims, 18 Drawing Sheets

(58) Field of Classification Search
USPC ......... 99/295, 299, 287, 289, 275–277, 300, 99/349–352, 495
See application file for complete search history.

(56) References Cited

FOREIGN PATENT DOCUMENTS

| WO | 2006/005736 A2 | 1/2006 |
|---|---|---|
| WO | 2012/085774 A1 | 6/2012 |
| WO | 2014/027297 A1 | 2/2014 |

\* cited by examiner

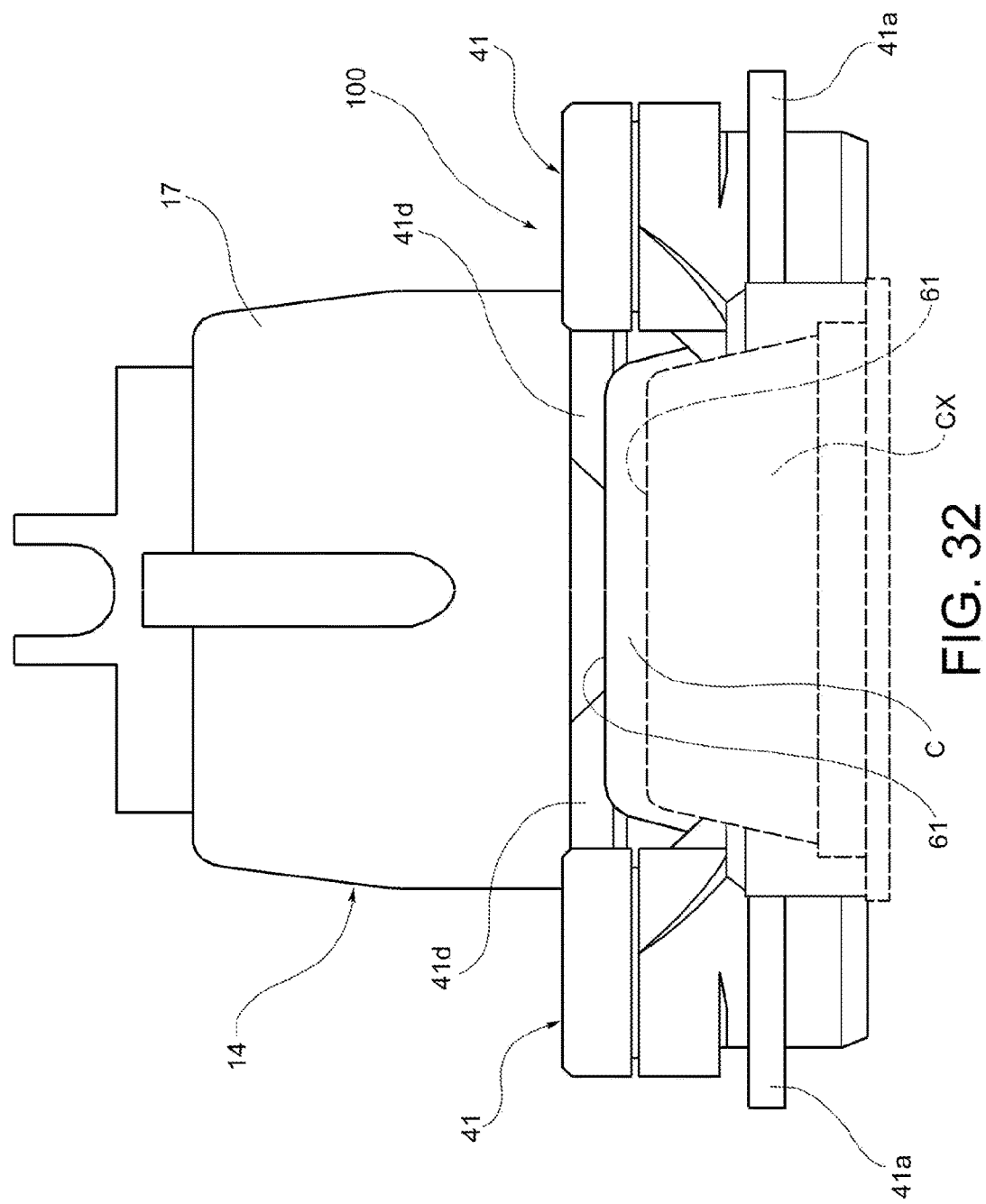

GRIPPER RETENTION DEVICE FOR A CAPSULE OR THE LIKE IN A MACHINE FOR THE PREPARATION OF BEVERAGES, IN PARTICULAR ESPRESSO COFFEE

The present invention relates to a gripper device for retaining a capsule or the like in a machine for the preparation of beverages, in particular espresso coffee.

More specifically the present invention relates to a gripper retention device of the type comprising:

a pair of opposite movable jaws having respective coordinated gripping profiles intended to cooperate with corresponding predetermined portions of the lateral surface of a capsule of a (first) predetermined type so as to define a retaining position for such a capsule in which the capsule is essentially coaxial with a predetermined reference direction, said jaws being able to assume a relative rest or standby position in which they are close to one another and inlet portions thereof are capable of being splayed and passed beyond by a capsule introduced into the machine, so as to allow said capsule to be positioned and gripped between said gripping profiles in said retaining position.

Gripper retention devices of this type are described for example in international patent application WO-2006/005736-A and in European application EP 1,721,553 A.

In these known solutions the gripper retention devices are attached to the stationary part of the brewing unit of the machine for preparing beverages.

In the apparatus according to WO-2006/005736-A the jaws of the retaining device are rotatable in a vertical plane about respective parallel horizontal axes.

In the apparatus according to EP 1,721,553 A the jaws are pivotable in a horizontal plane about respective vertical axes.

In other known solutions the gripper retention devices are attached to the movable part of the brewing unit.

In general, the gripper retention devices are typically designed to operate with a specific type of capsule having a predetermined form and dimensions.

The arrangement is in general such that, when a capsule of the type envisaged is arranged and gripped between the gripping profiles of the jaws in the retaining position, it is substantially coaxial with a predetermined reference direction, namely the direction of alignment of the parts (usually one fixed and one movable) of the brewing unit of the machine.

It may moreover happen that in a machine envisaged for use of a given type of capsule a capsule of a different type may be able to be introduced and may be such that it can splay and pass beyond the engaging or inlet portions of said jaws, so as to reach the zone in which it may then be "trapped" by the brewing unit.

It is therefore an object of the present invention to provide a gripper retention unit which, being intended for use with a predetermined type of capsule, is able to prevent the use of (at least) one other and different type of capsule having dimensional and form characteristics which are known.

This object, together with other objects, is achieved according to the invention by a gripper retention unit of the type specified above, characterized in that the jaws, adjacent to the aforementioned coordinated gripping profiles, have respective further coordinated gripping profiles able to cooperate with corresponding predetermined portions of the lateral surface of a capsule of a further and different type able to be introduced into the machine as well as to splay and pass beyond the inlet portions of said jaws; said further coordinated profiles being shaped and/or arranged such that they are capable of defining, for a capsule of said further type, a corresponding retaining position in which the capsule of said further type is axially offset by a predetermined amount with respect to said predetermined reference direction.

In one embodiment, each jaw of the gripper retention device has a gripping profile and a further gripping profile which are staggered with respect to one another at least along said predetermined reference direction.

In each jaw the gripping profile and the further gripping profile may be integral with each other or may be mounted on respective parts of the jaw which are movable relative to one another.

Further characteristic features and advantages of the invention will become clear from the following detailed description provided purely by way of a non-limiting example, with reference to the accompanying drawings in which:

FIG. 32 is a view similar to that shown in FIG. 31 and shows the different modes of interaction between the gripper retention device and the capsules of the types shown in FIGS. 2 and 3.

Figure 1:
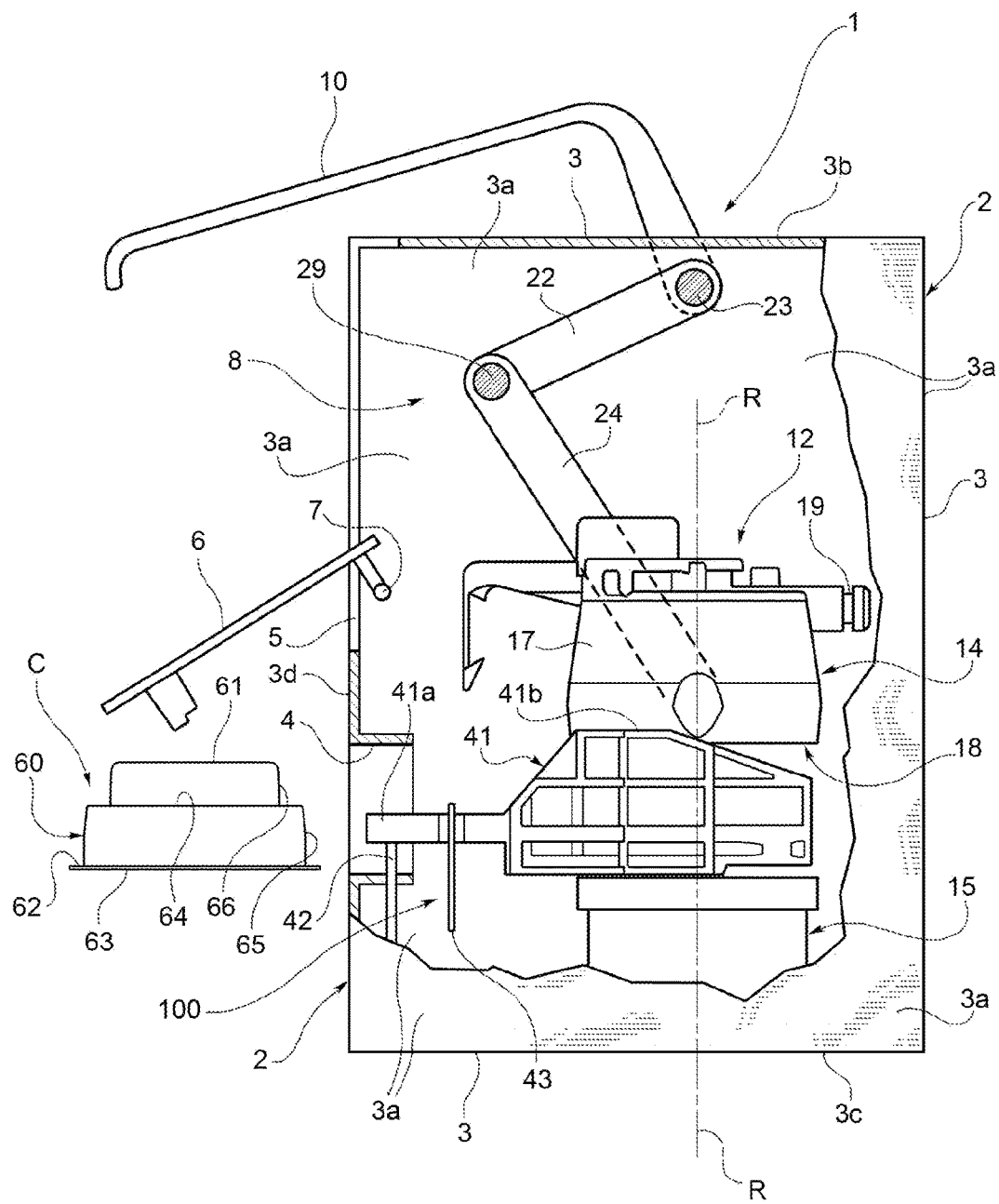
FIG. 1 shows a partially cross-sectioned, partial side view of a machine for preparing beverages comprising a gripper retention device according to the present invention.

In FIG. 1, a machine for the preparation of beverages, in particular hot beverages, such as espresso coffee, using capsules or the like, is denoted overall by 1.

The machine 1 comprises in a manner known per se a support and guide structure 2 which is operationally stationary.

In the embodiment schematically shown by way of example, the structure 2 comprises a box-shaped body 3, of substantially parallelepiped shape, with two main vertical side walls 3a facing each other, a horizontal top wall 3b, a likewise horizontal bottom wall 3c and a vertical side wall 3d.

The side wall 3d has, formed therein, an opening 4 for introducing a capsule C containing a quantity or dose of a substance for preparation of the beverage. This substance may be, for example, ground roasted coffee.

The capsule C is a capsule of a first type, with predetermined characteristics in terms of form and dimensions, specifically envisaged for use in the machine 1.

Figure 2:
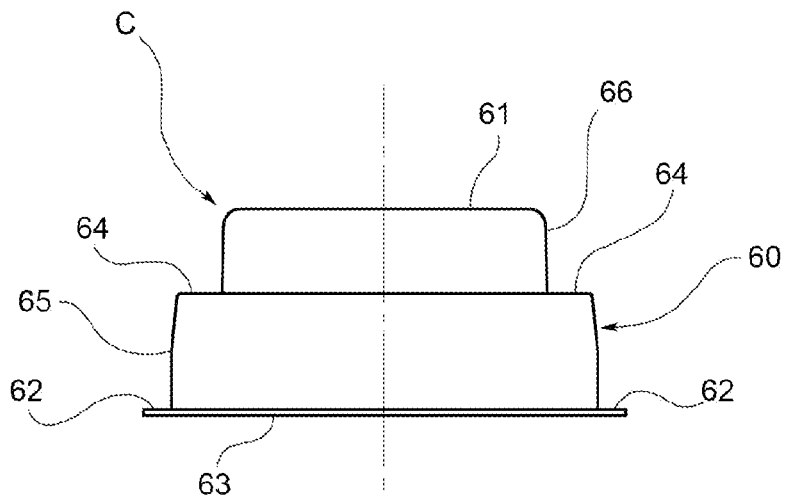
FIG. 2 is a side view of a capsule of the type envisaged for use in the machine according to FIG. 1.

A more detailed description of the capsule C will follow, with particular reference to FIG. 2.

The side wall 3d of the body 3 also has, formed therein, an opening or slot 5 inside which a pusher member 6 may be rotatably mounted, said member being pivotable about a horizontal pin 7.

A kinematic actuating device, denoted overall by 8, is connected to an operating lever 10 which is in turn hinged with the body 3 about a horizontal pin 23.

The structure of the kinematic mechanism 8 shown by way of example in FIG. 1 will be described more fully further below.

As can be seen in FIG. 1, a brewing unit denoted overall by 12 is mounted in the body 3. This unit 12 comprises a movable part 14 and an associated cooperating part 15 which in the embodiment shown is substantially stationary. These parts 14 and 15 are situated facing each other and aligned with each other in a reference direction denoted by R-R in FIG. 1. The movable part 14 may be moved towards and away from the cooperating part 15 along the direction R-R.

The movable part 14 of the brewing unit 12 comprises a hollow body 17 which is essentially bell or cup shaped and which has, defined therein, a downwardly open cavity 18 able to receive the capsule C for preparation of a beverage.

In a manner not shown, but known per se, the cavity 18 of the body 17 may contain a perforation device, likewise known per se, comprising for example a plurality of spikes suitable for tearing the bottom of a capsule C.

The region inside the cavity 18 of the body 17 communicates with a passage inside a union 19 which has, connected thereto in a manner not shown, a tube for dispensing the beverage made into a receiving container such as a cup or a glass.

The cooperating part 15 of the brewing unit 12 in a manner known per se and not shown comprises further perforation means which are intended to tear the lid of a capsule C as well as means for injecting hot water and/or pressurised steam inside a capsule C gripped between the parts 14 and 15 of the brewing unit.

In the example of embodiment shown, the kinematic actuating device 8 comprises a crank member 22 rotatable about a horizontal pivot pin 23 mounted transversely in the body 3. The crank member 22 is rotationally connected to the lever 10 and is hingeably mounted at 29 on the end of a connecting rod 24. The outer end of the connecting rod 24 is hinged with the body 17 of the movable part 14 of the brewing unit 12.

The kinematic device 8 described above is such that a rotation of the operating lever 10 about the axis 23 in the anti-clockwise direction and clockwise direction, respectively (when viewing FIG. 1), is able to cause displacement of the movable part 14 of the brewing unit 12 towards and away from, respectively, the associated stationary cooperating part 15 along the direction R-R.

Although in the embodiment shown in FIG. 1 the movement of the movable part 14 of the brewing unit 12 with respect to the cooperating part 15 is controlled manually, it is obvious for persons skilled in the art that this movement may be performed and controlled also by means of an actuating device, for example of the electrical or electrical/hydraulic type.

The arrangement described above is such that the movable part 14 is able to assume, with respect to the cooperating part 15, an open position—shown for example in FIG. 1—where a capsule C for preparing a beverage may be introduced into the space between the parts 14 and 15 of the brewing unit.

Figure 18:
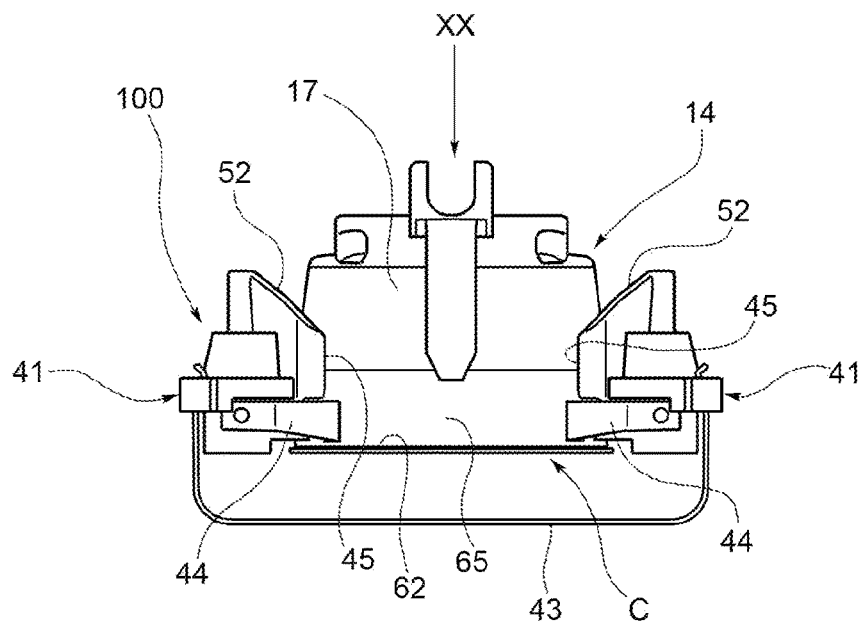
FIG. 18 is a view similar to that of FIG. 16 and shows a part of the brewing unit in the condition completely engaged with the capsule.
Figure 19:
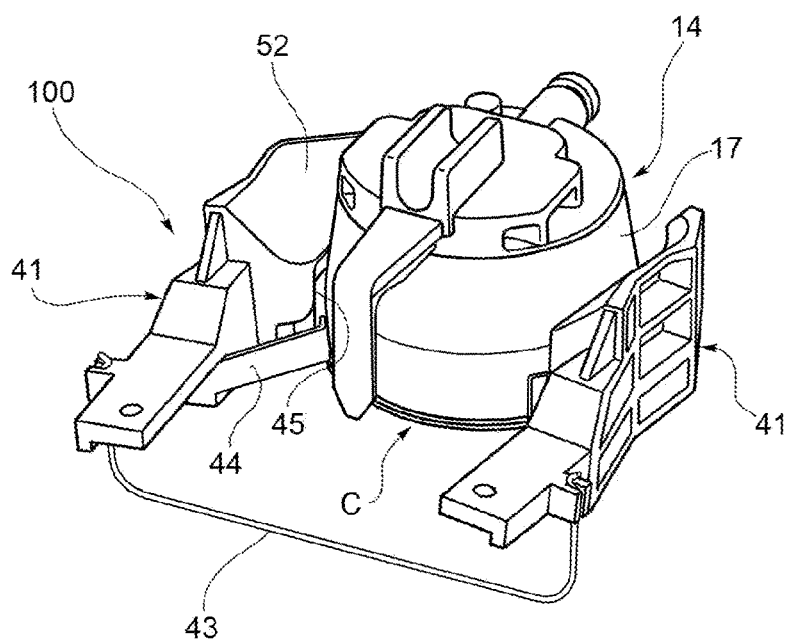
FIG. 19 is a perspective view corresponding to FIG. 18.
Figure 20:
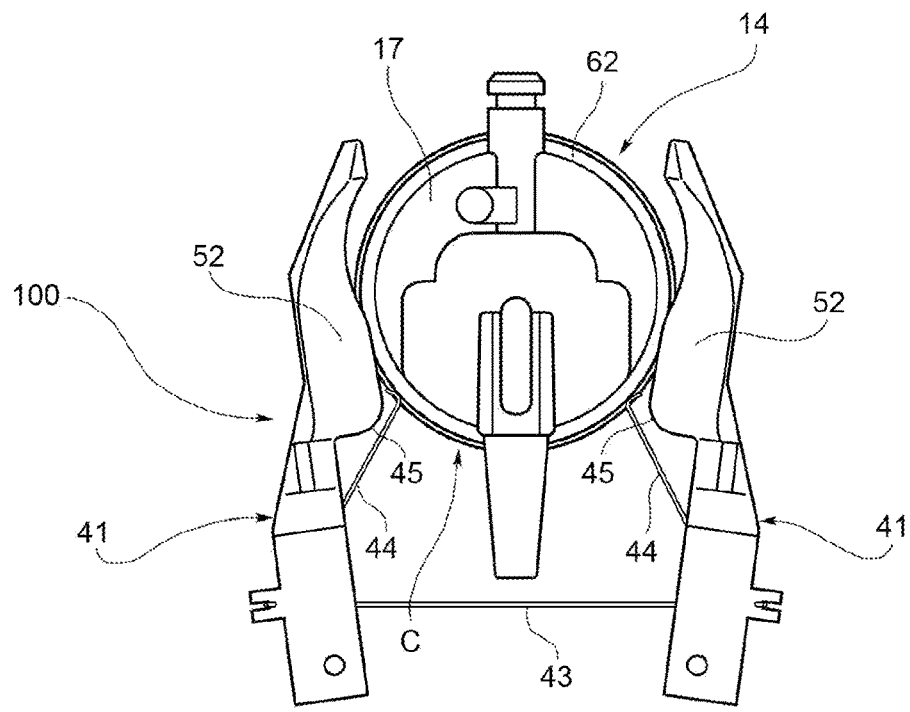
FIG. 20 is a top plan view in the direction of the arrow XX of FIG. 18.

The movable part 14 is also able to assume a closed position, shown in FIGS. 18 and 19, in which it is able to grip a capsule C against the cooperating part 15, in a liquid-tight manner, so as to allow the introduction, into this capsule, of a stream of hot water and/or pressurised steam, for preparation of a beverage.

A gripper retention device, denoted overall by 100, is provided between the movable part 14 and the cooperating part 15 of the brewing unit 12.

In the embodiment shown in the drawings this gripper retention device is stationary, namely is attached to the cooperating part 15.

In alternative embodiments, not shown, the gripper retention device 100 may be attached to the or a movable part of the brewing unit.

In the embodiment shown in FIG. 1 and in FIGS. 4 to 27, the gripper retention device 100 comprises, in a manner known per, a pair of jaws 41 which are mounted so as to be pivotable in an essentially horizontal plane about respective pivot pins 42 (FIG. 1).

A resilient member 43 interconnects the jaws 41, in the vicinity of the respective fulcrums, and tends to keep them in a relative rest position where they are close together, or in a closed condition, shown in FIGS. 1 and 4 to 6.

With reference in particular to FIGS. 4 to 9, each jaw 41 has a respective proximal portion 41*a* rotationally engaged about the corresponding pivot pin 42 (FIG. 1) and a respective shaped distal portion 41*b*.

The resilient member 43 extends underneath between the proximal portions 41*a* of the jaws 41.

The ends of respective flexible blade elements 44, which project, so as to converge towards each other in the direction of the distal portions 41*b* of the jaws, are connected to said proximal portions 41*a* of the jaws 41.

As can be clearly seen for example in FIGS. 4, 6, 9 and 15, each jaw 41 in its intermediate position has a respective inner protrusion 45. A narrow passage is defined between the facing protrusions 45 of the two jaws 41.

With reference in particular to FIGS. 7, 8, 15 and 26, the distal portions 41*b* of the jaws 41 have respective coordinated gripping profiles—denoted by 50 and 51—the characteristic features and functions of which will be described further below.

The gripping profiles 50, 51 of a jaw essentially face those of the other jaw.

Figure 8:
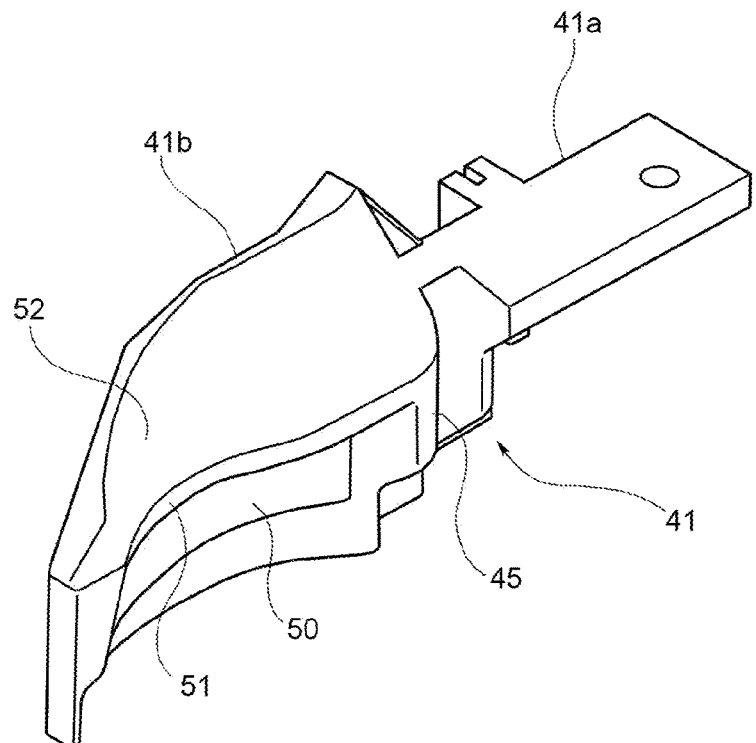
Figure 11:
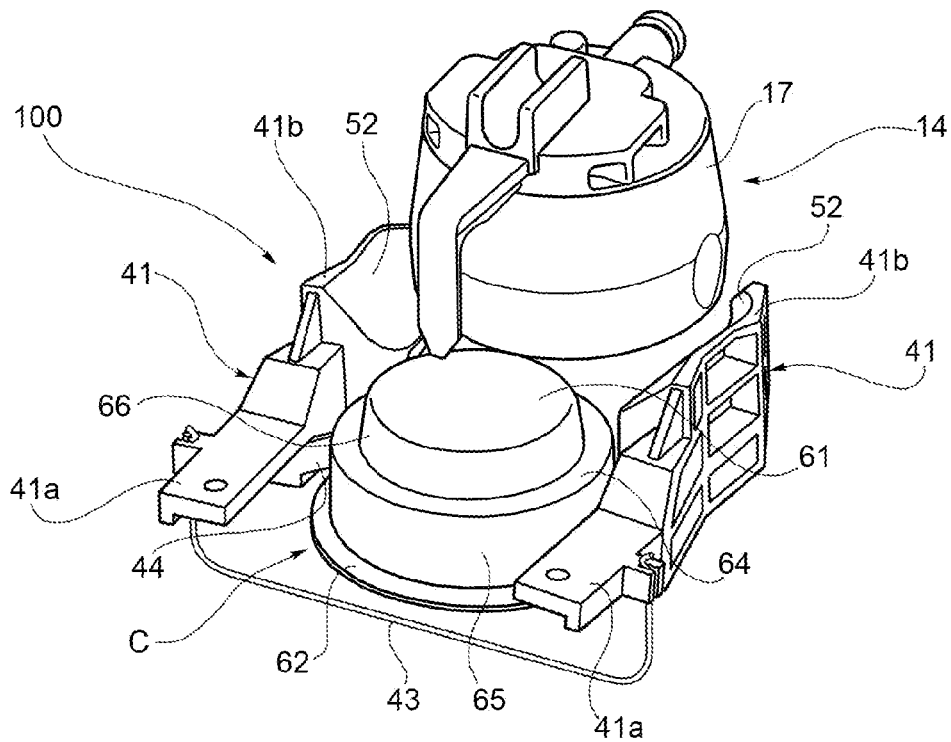
FIG. 11 is a perspective view corresponding to FIGS. 9 and 10.
Figure 12:
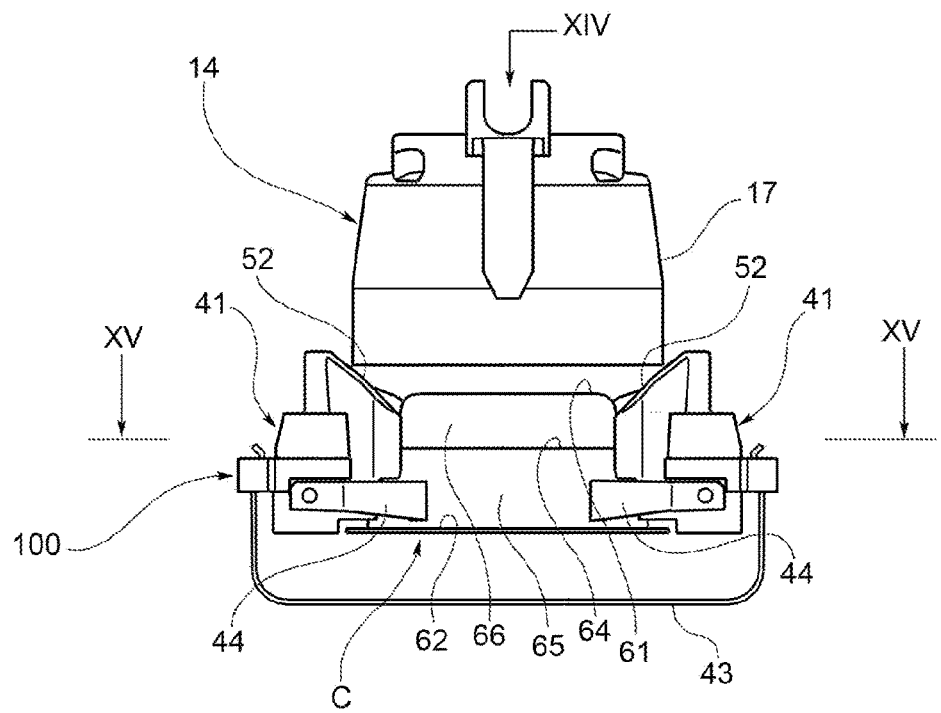
FIG. 12 is a front view, similar to that of FIG. 10, showing the capsule of said first type arranged and gripped between the gripping profiles of the jaws of the gripper retention device, aligned with the movable part of the associated brewing unit.
Figure 13:
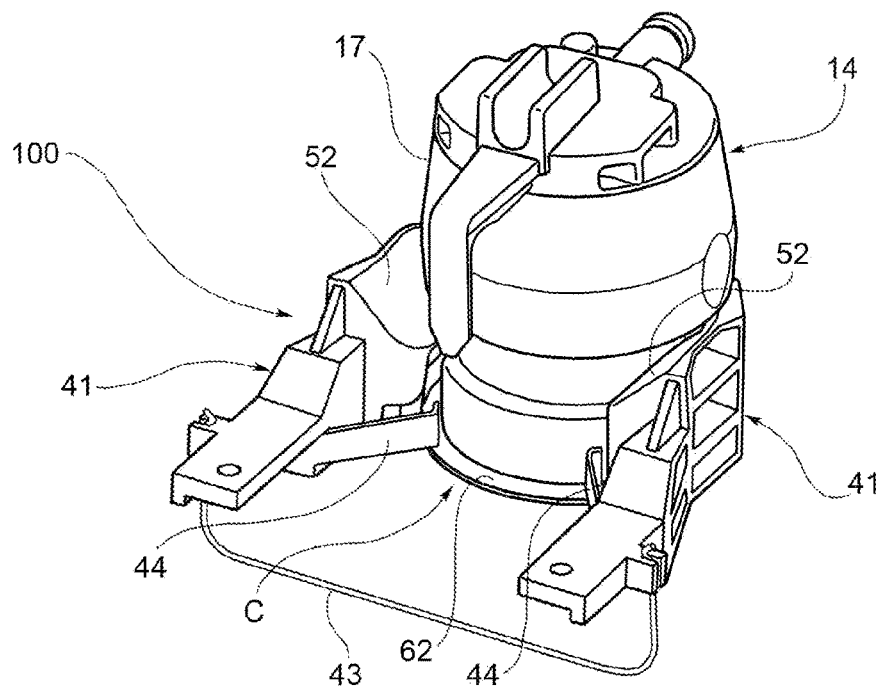
FIG. 13 is a perspective view corresponding to FIG. 12.

With reference in particular to FIGS. 8, 11 and 13, the distal portion 41*b* of each jaw 41 above the coordinated gripping profiles 51 and 50 forms a respective surface 52 with an inclined profile.

Viewing for example FIG. 13, the inclined-profile surfaces 52 of the two jaws converge towards each other in a downwards direction.

As will appear more clearly below, the coordinated gripping profiles 50 of the jaws 41 are intended to cooperate with corresponding portions of the lateral surface of a capsule C of the predetermined type which is specifically intended for use in the machine 1.

The coordinated gripping profiles 51 are instead intended to cooperate with corresponding portions of the lateral surface of a capsule with known characteristics, which is to be prevented from being used in the machine 1.

In the remainder of the present description as well as in the drawings (FIG. 3 and FIGS. 21-27) a capsule of this second and different type is indicated by "CX".

With reference in particular to FIGS. 1, 2 and 11, the capsule C which is intended to be used in the machine 1 in the example shown is a capsule of the type forming the subject of Italian patent application No. TO2012A000724 filed on 13 Aug. 2012 in the name of the same Applicant. This capsule comprises essentially a cup-shaped body 60 with a bottom wall 61 which may be substantially flat or curved, towards the inside or outside of the capsule.

The body 60 of the capsule C has an end flange 62 which projects radially outwards and to which a sealing lid 63 is applied.

The capsule C contains a substance for preparing a beverage, for example ground roasted coffee, preferably compressed so as to form a compacted tablet or so-called "puck".

Preferably, the vacuum is formed inside the capsule C to a degree such that the lid 63 substantially adheres to the puck formed by the compressed substance contained inside said capsule.

Inside the capsule C the side wall of the body 60 has an intermediate stepped formation 64. This stepped formation 64 causes a sudden local variation in the cross-section of the body 60 of the capsule which therefore has two portions 65 and 66 having respective mean diameters which are markedly different.

The portion 65, adjacent to the flange 62, has a larger diameter, while the portion 66, adjacent to the end wall 61, has a smaller diameter.

A particular feature of the capsule C described above consists in the fact the stepped formation 64 is closer to the bottom wall 61 than to the projecting flange 62. This characteristic feature results in the advantages which are described in the abovementioned Italian patent application.

Figure 3:
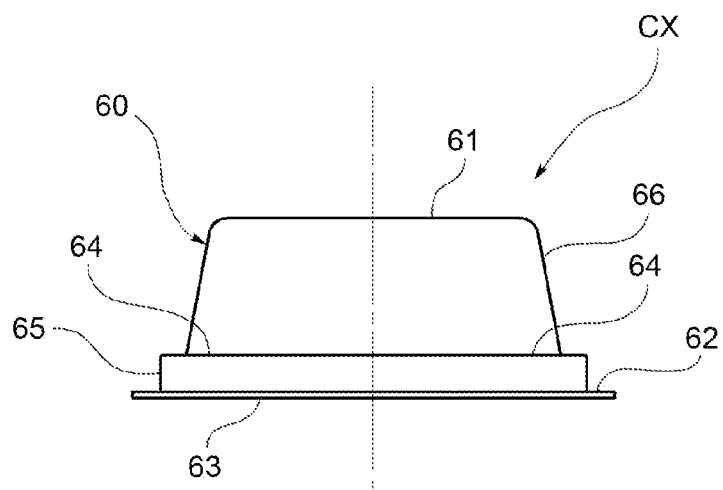
FIG. 3 is a side view of a further and different type of capsule which may be introduced into the machine according to FIG. 1 and which is to be prevented from being used in said machine.

With reference to FIG. 3, the capsule CX which is to be prevented from being used in the machine 1 is, from the point of view of its form, similar to the capsule C. In the embodiment shown in FIG. 3, the capsule CX is for example of the type forming the subject of the European patent application EP 1,886,942 A1 in the name of the same Applicant. A capsule of this type is produced and distributed by the Applicant under the trade name "A Modo Mio".

With reference to FIG. 3, the capsule CX also has a body 60 which is essentially cup-shaped, with a bottom wall 61 and, on the opposite side, a flanged edge 62 projecting radially outwards. The external diameter of the flanged edge 62 is the same as or very similar to that of the capsule C.

Also in the case of the capsule CX the body 60 has a side wall with an intermediate stepped formation 64 which divides said body into a portion 65 of larger diameter and a portion 66 of smaller mean diameter. The portion 65 of the body 60 is adjacent to the flanged edge 62, while the portion 66 is adjacent to the bottom wall 61.

The mean diameter of the portion 65 of the body of the capsule CX is similar to that of the portion 65 of the body of the capsule C. However, in the case of the capsule CX the stepped formation 64 is much closer to the flanged edge 62 than to the end wall 61.

The portion 65 of the body of the capsule C, in the proximity of the stepped formation 64, has a diameter appreciably greater than that of the portion of the body of the capsule CX, at the same distance from the projecting flanged edge 62.

The capsule CX also has a height smaller than that of the capsule C.

The above having been stated, the coordinated gripping profiles 50 of the jaws 41 are intended to cooperate with corresponding predetermined portions of the lateral surface of a capsule C, forming part of the portion 65 of the body of this capsule C, adjacent to the stepped formation 64. In particular, the coordinated gripping profiles 50 are essentially complementary, in terms of form, to a part of the portion 65 and the stepped formation of a capsule C.

The arrangement of the coordinated gripping profiles 50 is such that, as will appear more clearly below, via said profiles the jaws 41 are able to define, for a capsule C of the type intended for use in the machine 1, a retaining position in which said capsule is essentially coaxial with the reference or alignment direction R-R (FIG. 1).

As already mentioned above, when there is no capsule arranged between them, the jaws 41 assume a relative rest or standby position close to each other (FIGS. 1 and 4 to 6). In this condition the jaws 41 are able to be splayed, against the action of the resilient opposition member 43, by a capsule C introduced into the machine 1 through the inlet passage 4. A capsule C introduced between the jaws 41 of the gripper retention device 100 is in fact capable, with its portion 65, of interfering with the protuberances 45 of said jaws (which are separated in the rest condition by a distance smaller than the diameter of said portion 65 of the capsule C), causing splaying thereof.

Figure 14:
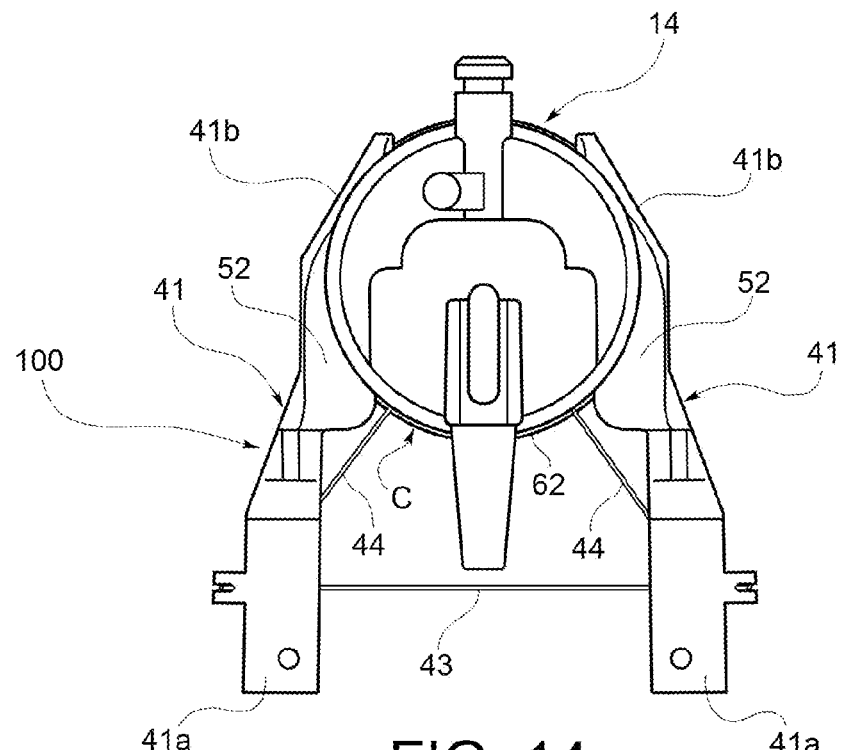
FIG. 14 is a top plan view in the direction of the arrow XIV of FIG. 12.
Figure 15:
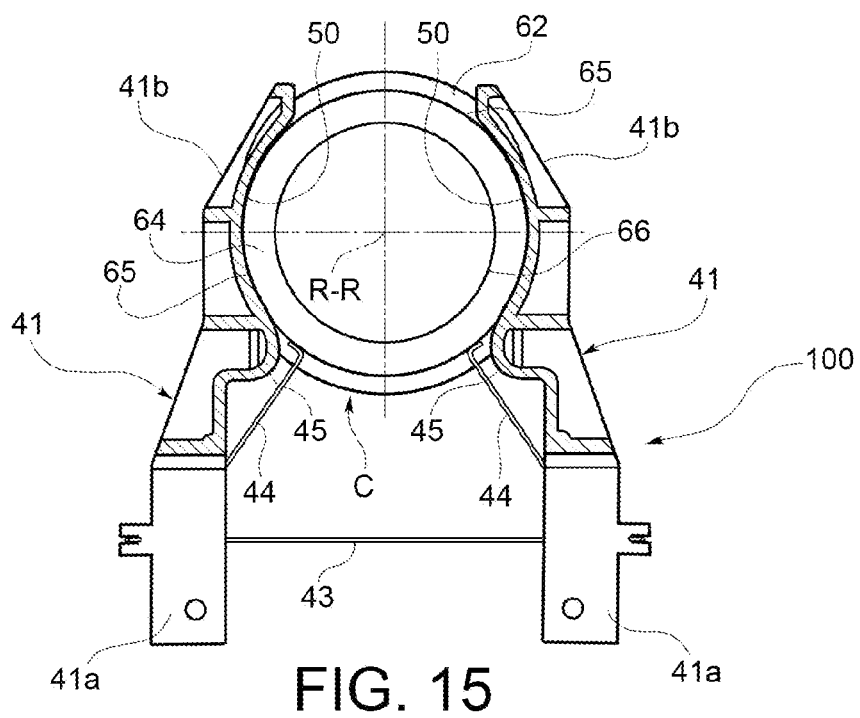
FIG. 15 is a cross-sectional view along the line XV-XV of FIG. 12.

The capsule C introduced between the jaws, following the action of the resilient member 43 which tends to close the jaws 41 is able to pass beyond the restriction defined between the protuberances 45, being arranged between the distal portions 41*b* of these jaws, where it is gripped between the gripping profiles 50 and arranged and held in the aforementioned retaining position where it is coaxial with the alignment direction R-R (FIGS. 13-15).

In FIG. 15, in particular, it is possible to see in particular the form-fitting engagement between the coordinated gripping profiles 50 of the jaws 41 and the portion 64-65 of the body of the capsule C.

The further coordinated gripping profiles 51 of the jaws 41 are instead intended to cooperate with corresponding portions of the lateral surface of the part 66 of the body of a capsule CX which is to be prevented from being used in the machine 1.

Figure 24:
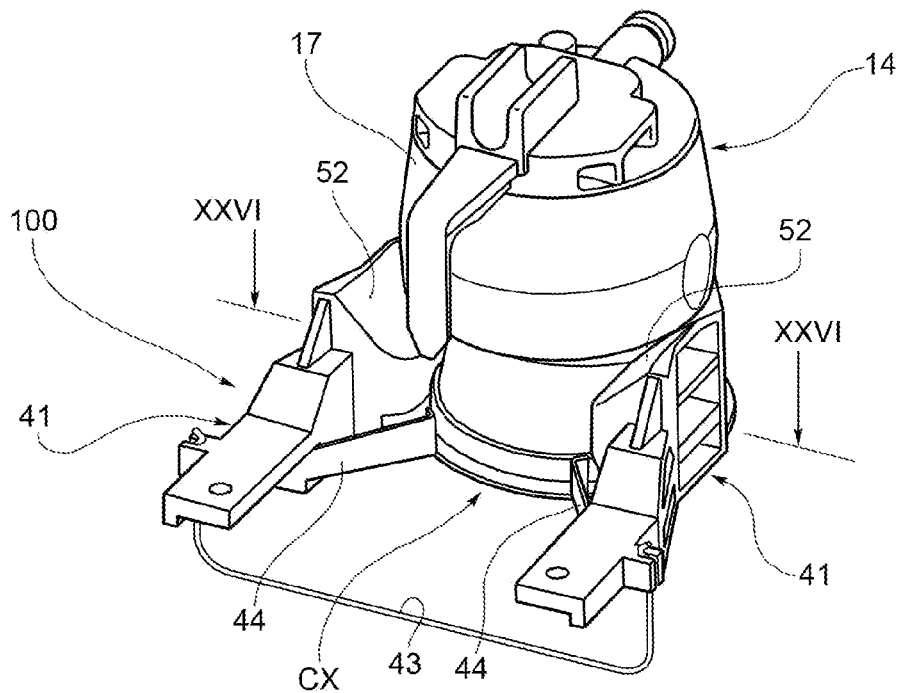
FIG. 24 is a perspective view similar to that of FIG. 17 and shows the capsule of the type according to FIG. 3 arranged and gripped between the jaws of the retaining device.
Figure 25:
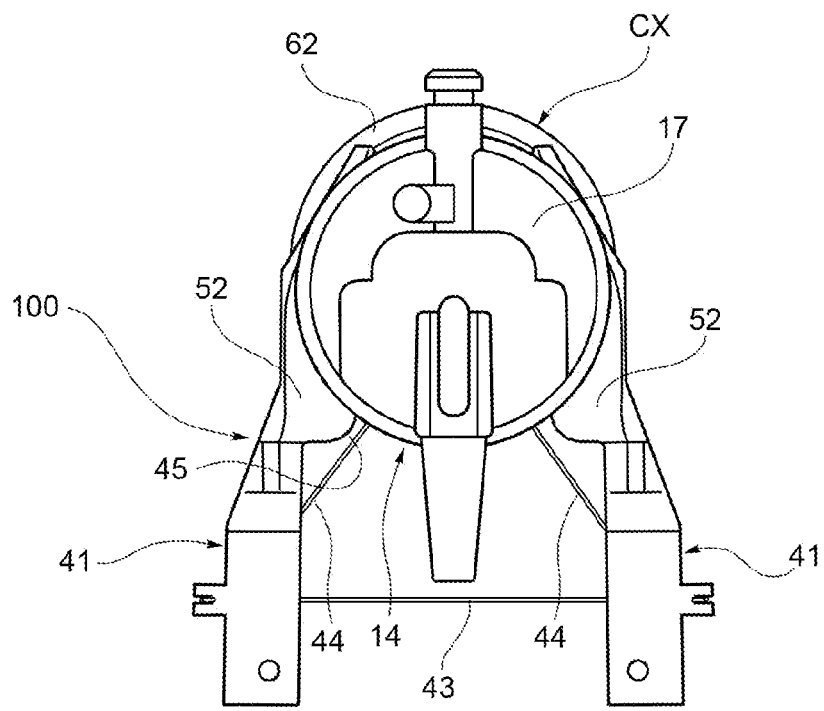
FIG. 25 is a top plan view corresponding to FIG. 24.
Figure 26:
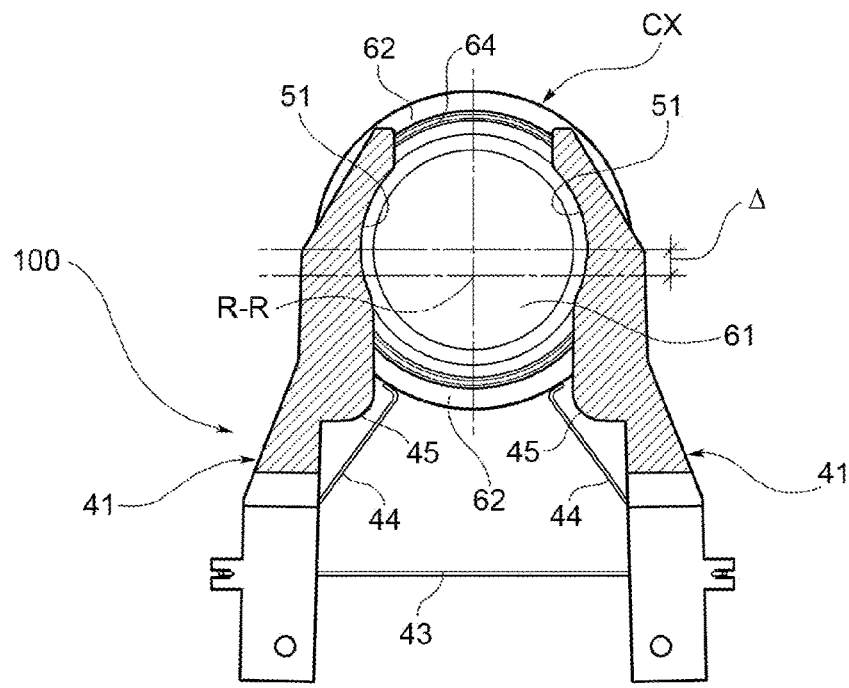
FIG. 26 is a cross-sectional view along the line XXVI-XXVI of FIG. 24.
Figure 27:
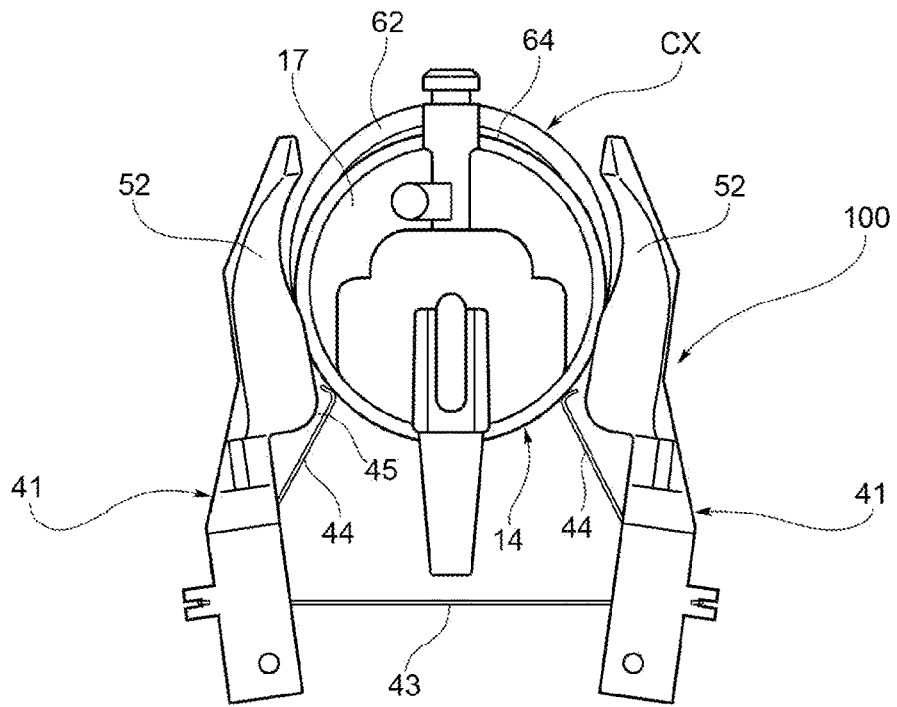
FIG. 27 is a top plan view similar to that shown in FIG. 25 and shows a condition in which a part of the brewing unit splays the jaws and moves towards the capsule of the type according to FIG. 3 which is arranged axially offset with respect thereto.
Figure 28:
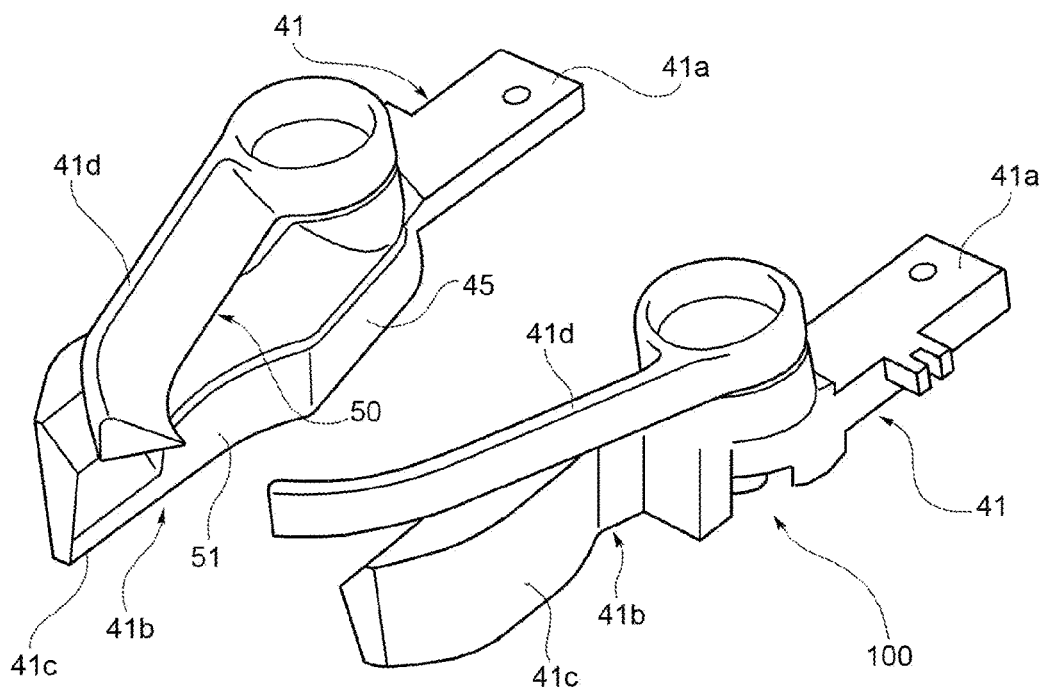
FIG. 28 is a perspective view of another embodiment of a gripper retention unit according to the present invention.
Figure 29:
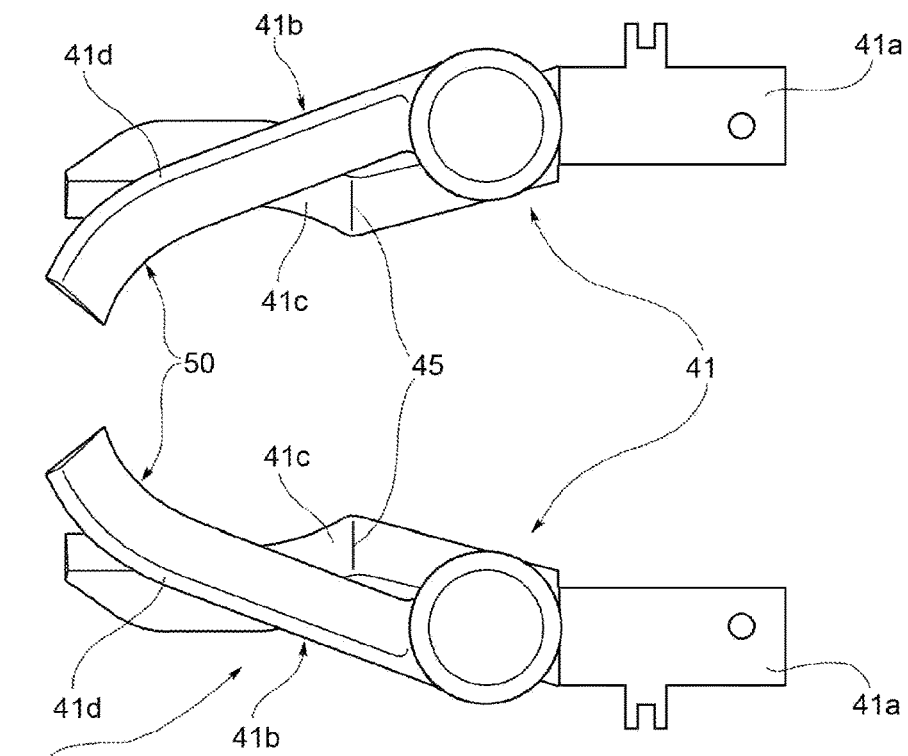
FIG. 29 is a top plan view of the gripper retention device according to FIG. 28.
Figure 31:
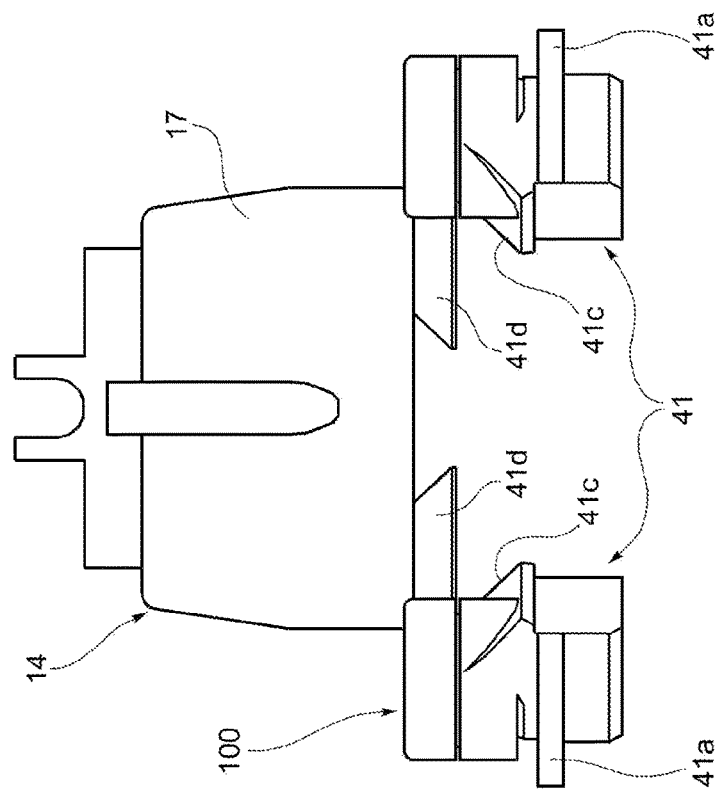
FIG. 31 is a front view in the direction of the arrow XXXI of FIG. 30.
Figure 30:
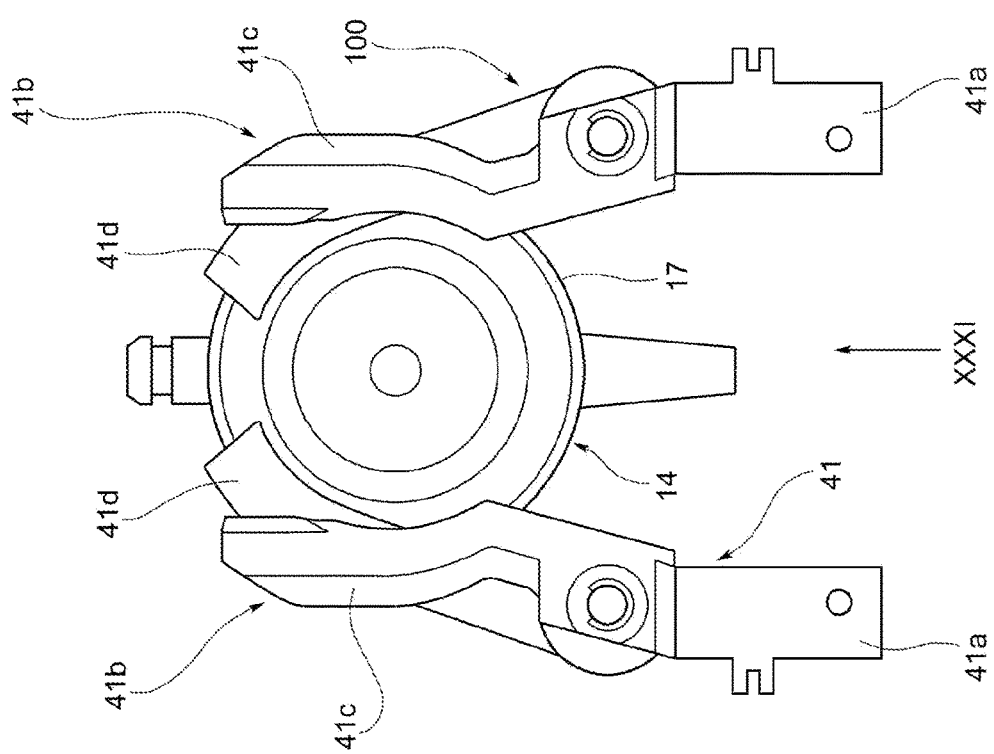
FIG. 30 is a bottom plan view of the gripper retention unit according to FIGS. 28 and 29 and of a part of the associated brewing unit.

These further coordinated profiles 51 are in fact shaped and arranged so that they are able to define, for a capsule CX, a corresponding retaining position—shown in FIGS. 24-26, in which the capsule CX of the undesirable type is axially offset by a predefined amount Δ (FIG. 26) with respect to the aforementioned reference or alignment direction R-R.

Owing to this characteristic feature, as will be understood more clearly from the continuation of the present description, the capsule CX of the undesirable type cannot be used in the machine 1.

An operating cycle of the machine 1 using a capsule C, with particular reference to FIGS. 1 and 2 and 4 to 20 will now be described.

Figure 4:
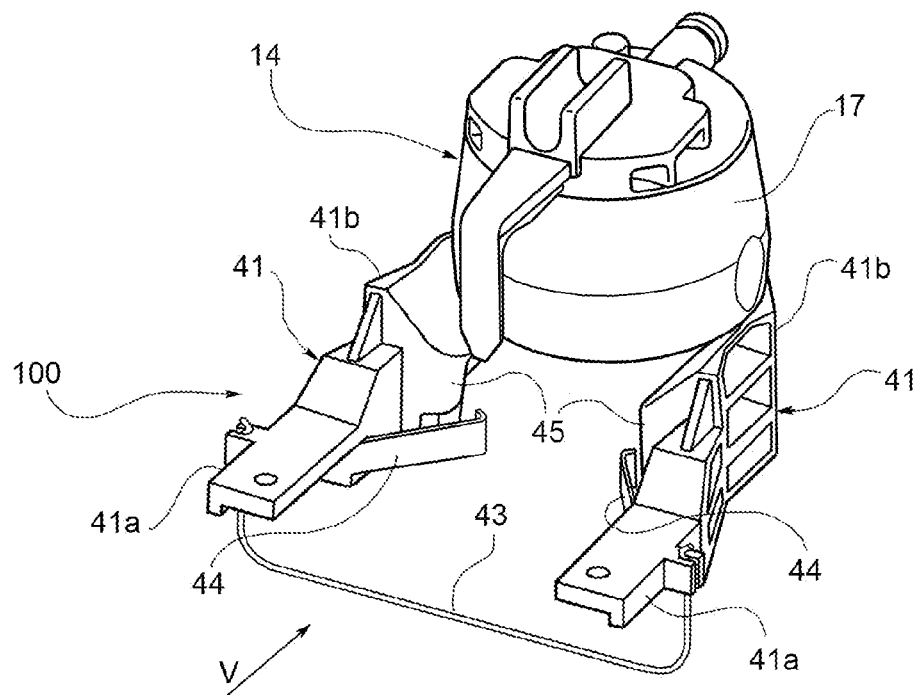
FIG. 4 is a perspective view which shows a first embodiment of a gripper retention device according to the invention and a part of the associated brewing unit, shown in the rest or standby condition.
Figure 5:
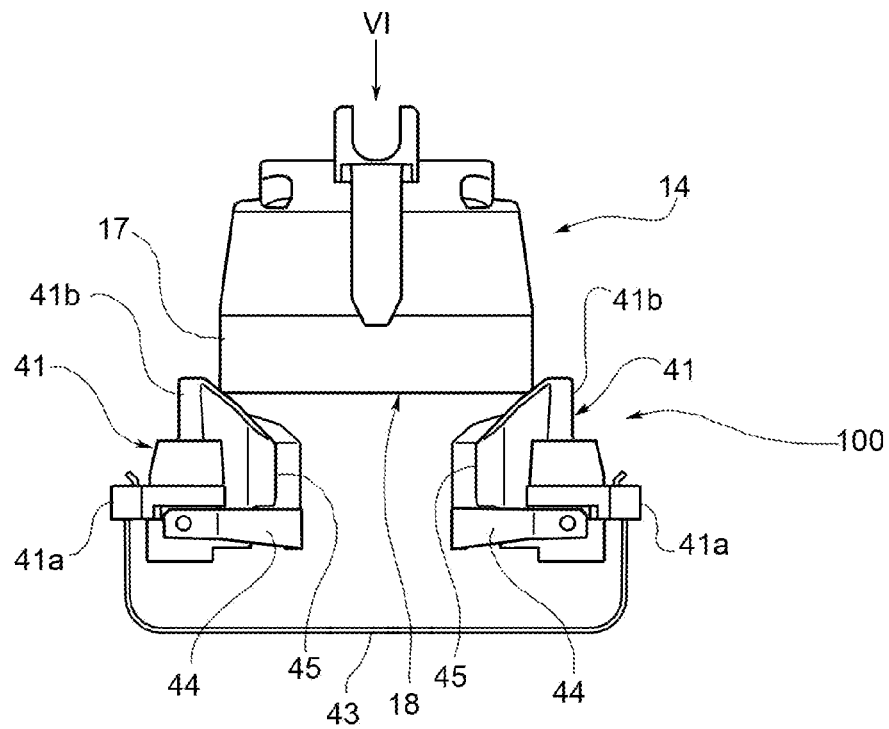
FIG. 5 is a front view in the direction of the arrow V of FIG. 4.
Figure 6:
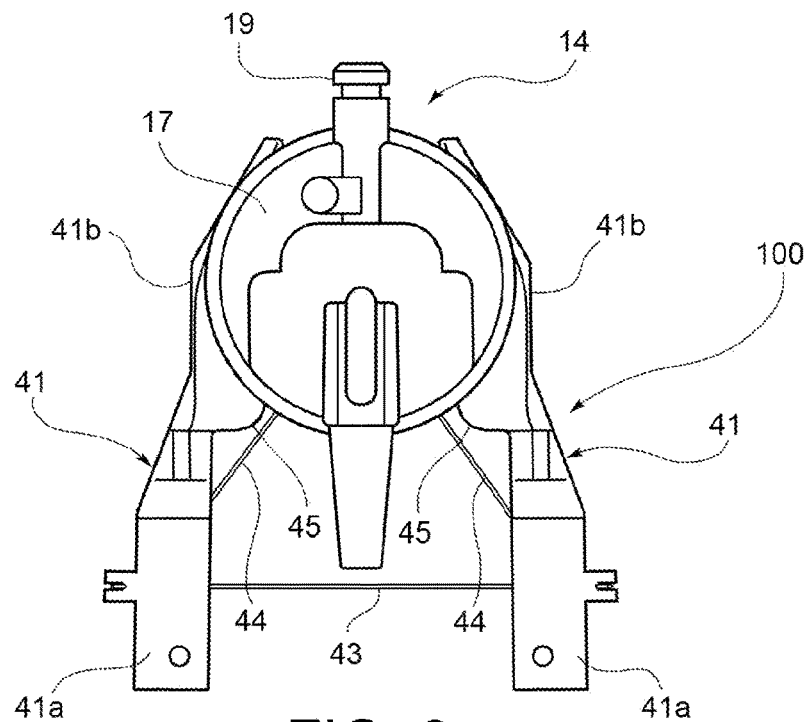
FIG. 6 is a top plan view in the direction of the arrow VI of FIG. 5.

The gripper retention device 100 of the machine 1 is initially in the rest condition shown in FIGS. 4 to 6.

Figure 9:
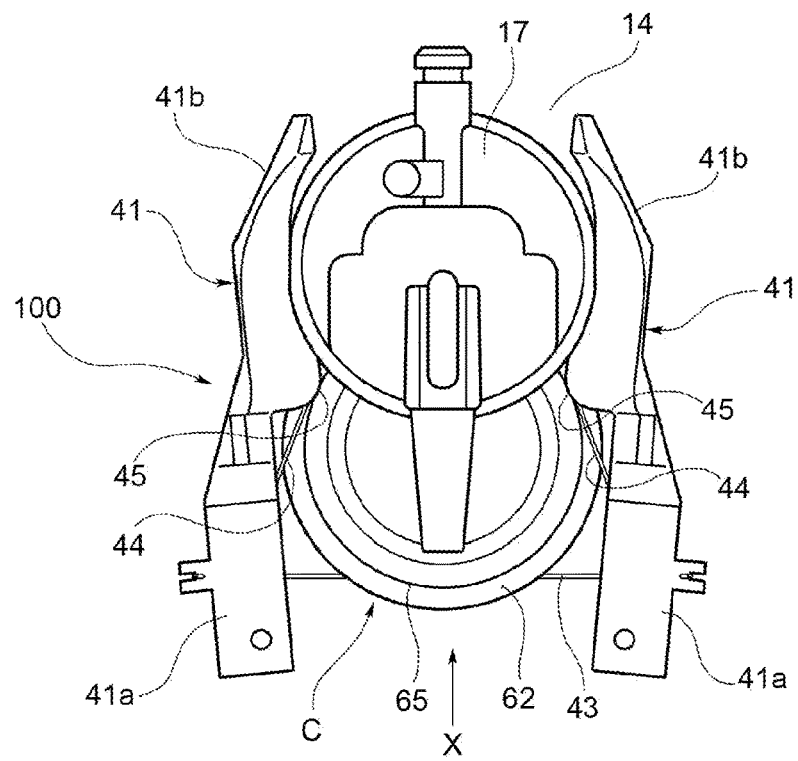
FIG. 9 is a view similar to that of FIG. 6 and shows the gripper retention device and a part of the associated brewing unit in the condition where a capsule of a first type, envisaged specifically for use with this gripper retention device, is introduced between the jaws.
Figure 7:
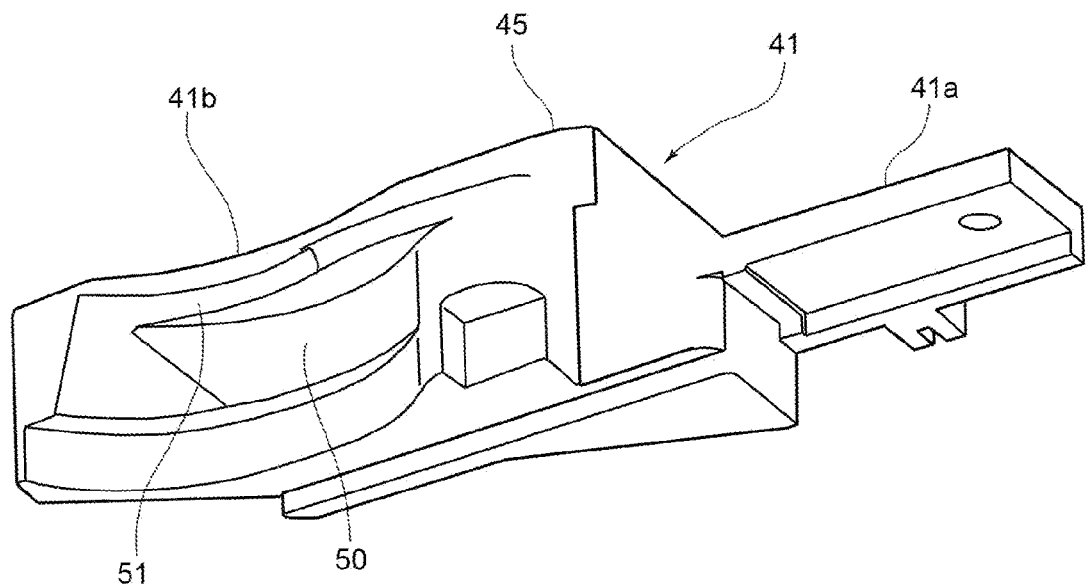
FIGS. 7 and 8 are perspective views of a jaw included in a gripper retention device according to the present invention.
Figure 10:
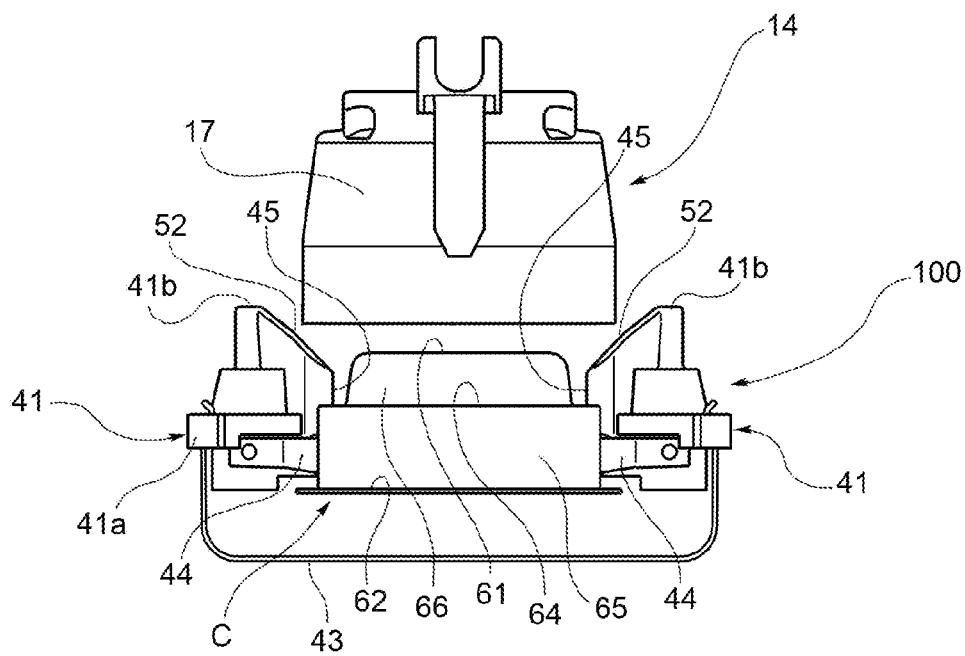
FIG. 10 is a front view in the direction of the arrow X of FIG. 9.

A capsule C is then introduced through the passage 4 in the body 3 of the machine 1 and is arranged between the proximal ends 41*a* of the jaws 41, as can be seen in FIGS. 9 to 11.

With its portion 65, the body of the capsule C interferes with the flexible blade elements 44, causing splaying thereof. The further feeding of the capsule C, performed by means of the pusher 6 (FIG. 1), causes the portion 65 of the capsule body to interfere with the intermediate protuberances 45 of the jaws 41 which are then splayed. The body of the capsule C then passes beyond the protuberances 45, and the distal portions 41*b* of the jaws 41 may, under the action of the resilient element 43, grip the body of the capsule C.

In particular, the coordinated gripping profiles 50 of the jaws 41 engage with the corresponding portions of the lateral surface of the capsule C, causing the arrangement thereof in the aforementioned retaining position in which the axis of the capsule C substantially coincides with the direction R-R of alignment between the movable part 14 and the cooperating part 15 of the brewing unit 12.

This situation is shown in FIGS. 12 to 15 where the movable part 14 of the brewing unit still remains in the initial position in which it is in a spaced relationship with respect to the associated cooperating part 15 such as to allow positioning of the capsule C between the coordinated gripping profiles 50 of the jaws 41.

It can be seen that in the condition shown in FIGS. 12 to 15, the flexing blade elements 44, released from the body of the capsule C, extend into the untensioned starting position above the flange 62 of this capsule.

The displacement of the movable part 14 of the brewing unit 12 towards the cooperating part 15 is then performed by operating the lever 10 (or by activating the electrical or electro-hydraulic actuating device which may be provided for this purpose).

Figure 16:
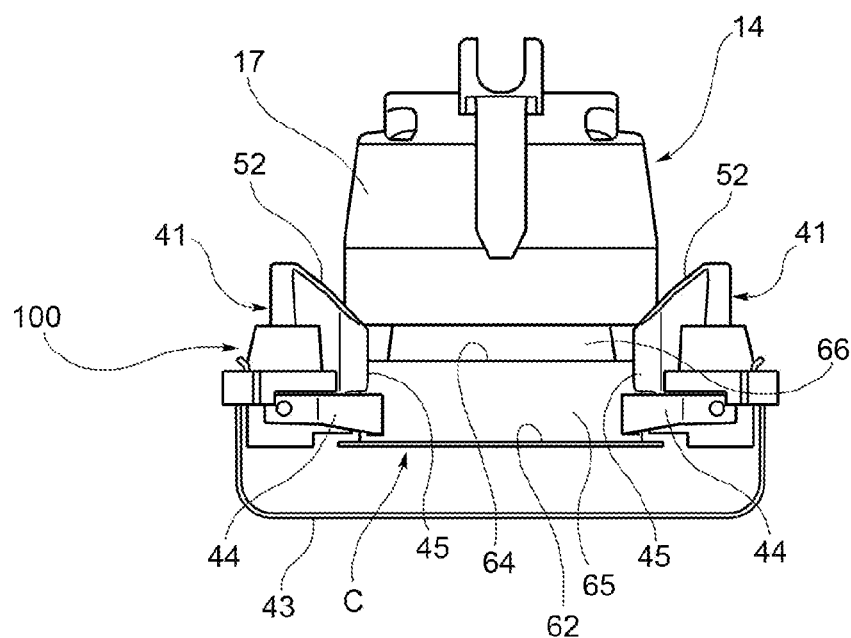
FIG. 16 is a view similar to that of FIG. 12 and shows a condition in which a part of the brewing unit splays the jaws of the gripper retention device and starts to engage with the capsule retained between them.
Figure 17:
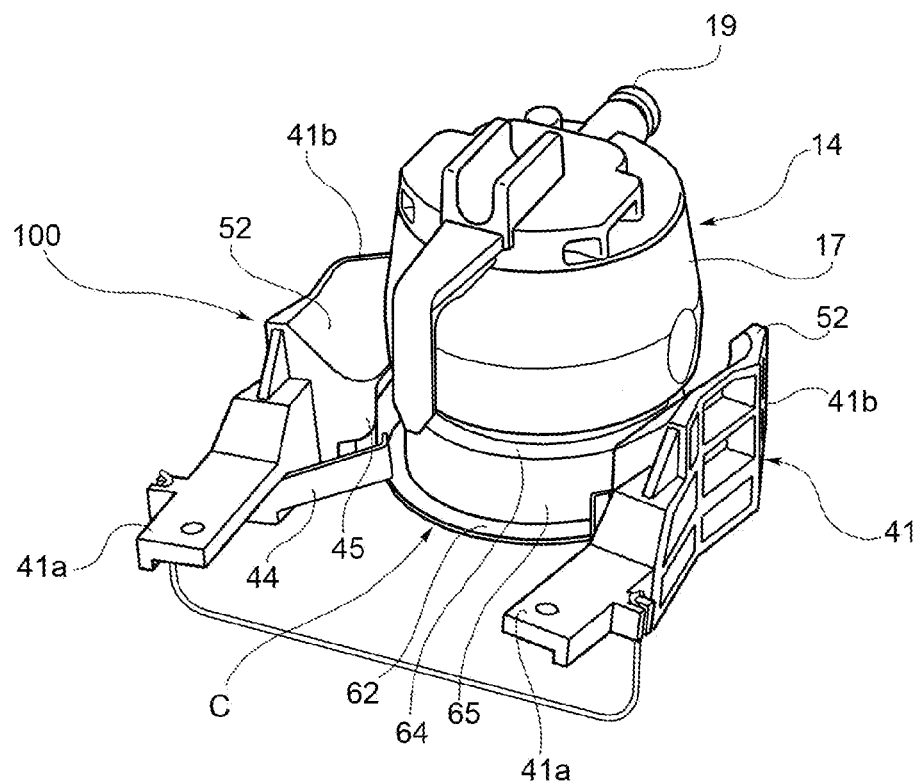
FIG. 17 is a perspective view corresponding to FIG. 16.

The body 17 of the movable part 14 of the brewing unit 12 starts to be arranged around the portion 66 of the body of the capsule C, as can be seen in FIGS. 16 and 17, and at the same time interferes with the inclined surfaces 52 of the distal portions 41*b* of the jaws 41, causing gradual splaying of the latter.

Once the brewing unit 12 has been closed, the capsule 16 is perforated and a stream of hot water and/or pressurised steam is introduced inside it so as to interact with the substance contained therein and result in the formation of the beverage.

Once extraction of the beverage has been completed, the body 17 of the movable part 14 of the brewing unit may be moved away again from the associated cooperating part 15, while the capsule C used is retained by the free ends of the blade elements 44 which extend above its flanged edge 62 (FIG. 19).

The used capsule C may then be removed in the ways and using means known per se.

With reference to FIGS. 2 and 21 to 27, an operating cycle of the machine 1 will now be described in the case where a capsule of the type CX, instead of a capsule C, is introduced into its inlet passage 4.

Figure 21:
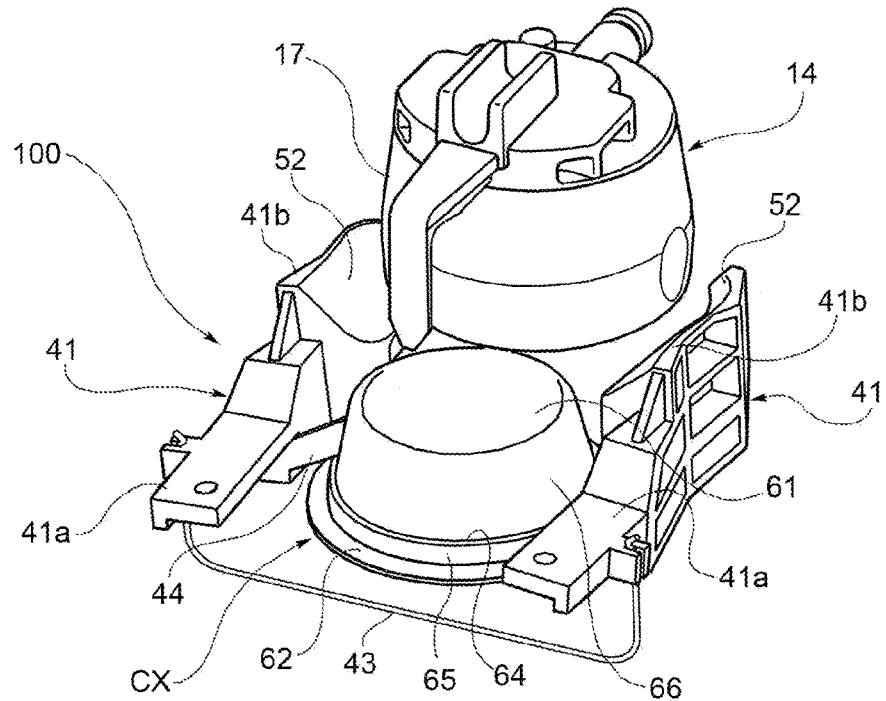
FIG. 21 is a view similar to that of FIG. 11 and shows the introduction of a capsule of the different type, shown in FIG. 3, into the gripper retention device according to the preceding figures.
Figure 22:
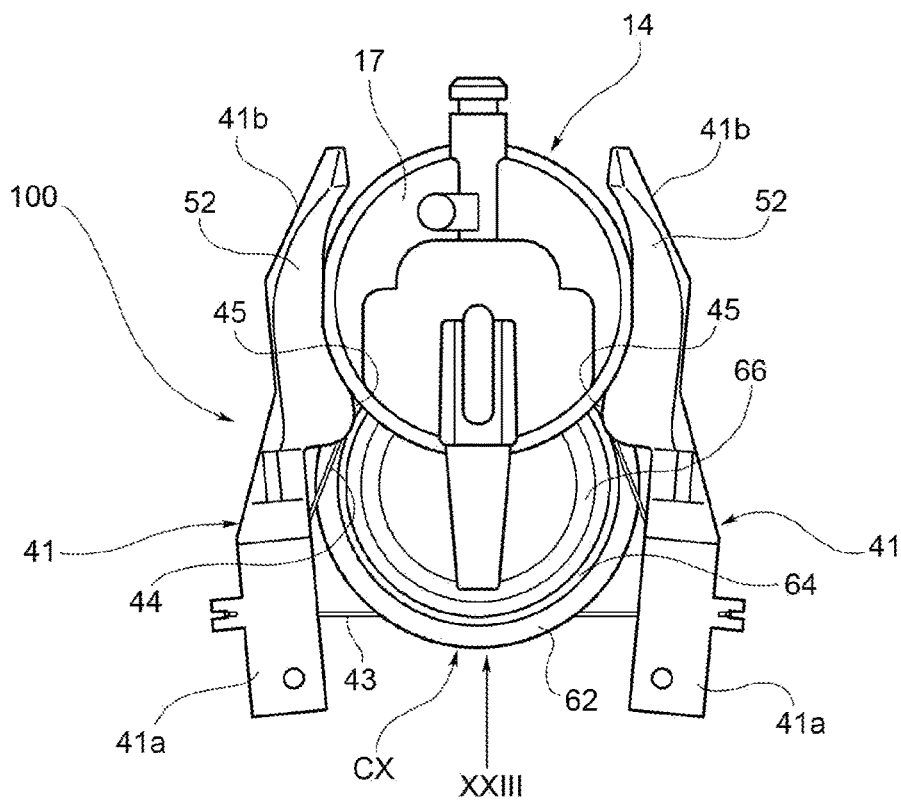
FIG. 22 is a top plan view corresponding to FIG. 21.
Figure 23:
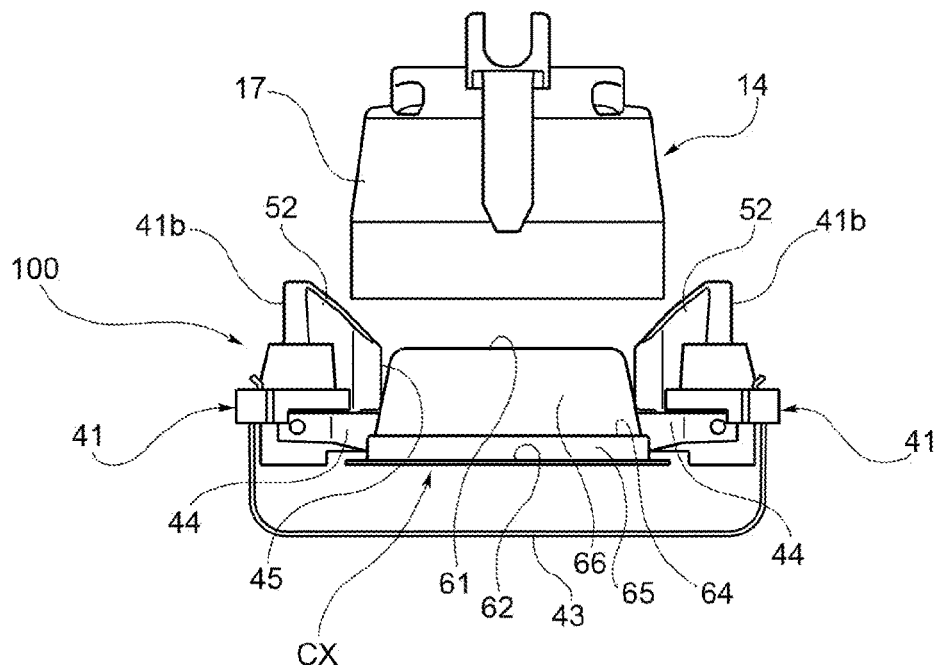
FIG. 23 is a front view in the direction of the arrow XXIII of FIG. 22.

As can be seen in FIGS. 21 to 23, the capsule CX introduced between the proximal portions 41*a* of the jaws 41 with its portion 66 causes firstly splaying of the flexible blade elements 44 and then, as a result of interference with the protuberances 45 of the jaws, splaying of the latter. The capsule CX therefore manages to pass beyond the restriction defined between the protuberances 45 and reach the distal portions 41*b* of the jaws 41, as shown in FIGS. 24 and 25. These jaws 41 close up, as a result of the action of the resilient member 43, and their coordinated gripping profiles 51 engage with the corresponding portions of the lateral surface of the capsule CX, as can be seen in particular in FIG. 26.

In this condition, however, the capsule CX is retained in a position where its axis is displaced by a distance Δ with respect to the axis R-R of alignment between the movable part 14 and the cooperating part 15 of the brewing unit 12.

The movable part 14 of this unit cannot therefore correctly engage coaxially with the body of the capsule CX which is therefore flattened and rendered unusable, for example owing to the loss of the hydraulic seal between the lid 63 and the flange 62.

It should also be noted that in the retaining position between the jaws 41, the capsule CX has its flanged edge 62 disengaged from the ends of the flexible blade elements 44. Therefore, at the end of the attempt to prepare a beverage using the capsule CX, the latter, damaged as described above, remains above the cooperating part 15 of the brewing unit, without being trapped inside the cup-shaped body 17.

With the gripper retention device 100 according to the present invention it is therefore possible to generate, in the case where the capsule CX is used, a malfunctioning condition such as to dissuade the user of the machine 1 from further attempts at using the capsules CX.

FIGS. 28 to 33 show a variation of embodiment of the gripper retention device according to the present invention.

In these figures, parts and elements which are the same or substantially equivalent to parts and elements already described have again been assigned the same reference numbers and letters used previously.

In the embodiment according to FIGS. 28 to 33, the distal portions 41*b* of the jaws 41 are in fact duplicated and comprise a bottom part 41*c*, which is formed as one piece with the proximal portion 41*a*, and a top portion 41*d*, which is rotatable about a vertical axis, relative to the remainder of the jaw.

Resilient members which are known per se and not shown, such as torsional springs, tend to keep the top portions 41*d* in the rest or standby position shown in FIGS. 28 to 31, where they converge towards each other away from the proximal portions 41*a* of the jaws.

Figure 33:
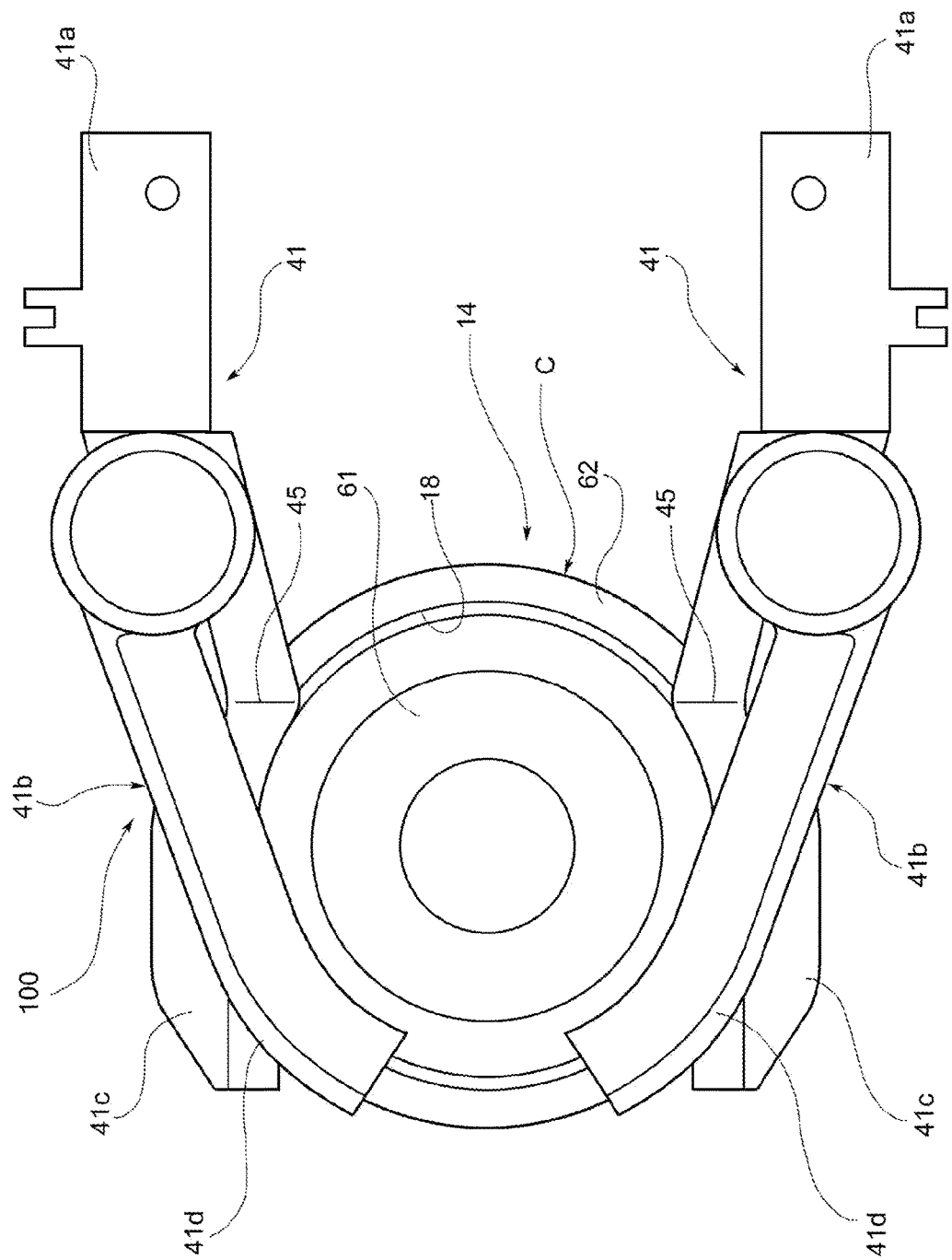
FIG. 33 is a top plan view corresponding to FIG. 32.

The distal ends of the portions 41*d* are curved, with an inner profile 50 essentially complementing a top lateral surface portion of a capsule C, as can be seen in FIG. 32 and, in particular, in FIG. 33.

The arrangement is such that, when a capsule C is introduced into the gripper retention device 100, as soon as its body has passed beyond the restriction defined between the protuberances 45 of the portions 41*c* of the jaws, the capsule body is arranged and retained in the retaining position shown in FIGS. 32 and 33, where the capsule is coaxial with the direction R-R of alignment between the movable part 14 and the cooperating part 15 of the brewing unit 12.

FIG. 32 shows in broken lines also the outline of a capsule of the type CX shown in the position assumed when it is introduced into the gripper retention device 100. As can be seen from this figure, the bottom wall 61 of the capsule CX extends to a height lower than the pivotable portions 41*d* of the jaws 41, so that these portions 41*d* are unable to retain a CX-type capsule in the retaining position envisaged for the C-type capsule.

The bottom portions 41*c* of the jaws 41 have respective further gripping profiles 51 which are shaped and arranged so that they are able to push a capsule CX beyond the retaining position envisaged for a capsule of the C type, such that a CX-type capsule is pushed into a position which is significantly axially offset from the direction of alignment R-R.

In the case of the embodiment according to FIGS. 28 to 33 a capsule of the CX type which may be introduced into the gripper retention device 100 is preferably expelled beyond the brewing unit 12 and when the latter is closed, the capsule CX is not damaged and may be recovered.

Obviously, without affecting the principle of the invention, the embodiments and the constructional details may be significantly modified with respect to that described and illustrated purely by way of a non-limiting example, without thereby departing from the scope of the invention as defined in the accompanying claims.

Thus, for example, the arrangement shown in FIG. 1 is to be regarded as being purely exemplary in nature. In fact, alternative arrangements are possible where the direction of alignment R-R is horizontal rather than vertical, or is vertical, but the arrangement is inverted (rotated through 180°) with respect to that shown in FIG. 1. Arrangements where the direction R-R is inclined or oblique are also possible.

The invention claimed is:

1. A gripper device (100) for retaining a capsule (C) in a machine (1) for the preparation of beverages, in particular espresso coffee, comprising
   a pair of opposite movable jaws (41) having respective coordinated gripping profiles (50) intended to cooperate with corresponding predetermined portions of the lateral surface of the capsule (C) of a first predetermined type so as to define a retaining position for such the capsule (C) in which the capsule (C) is essentially coaxial with a predetermined reference direction (R-R),
   said jaws (41) being able to assume a relative rest or standby position in which they are close to one another and inlet portions thereof (41*a*, 45) are capable of being splayed and passed beyond by the capsule (C) introduced into the machine (1), so as to allow said capsule (C) to be positioned and gripped between said gripping profiles (50) in said retaining position;
   the device being characterized in that said jaws (41), adjacent to said coordinated gripping profiles (50), have respective further coordinated gripping profiles (51) able to cooperate with corresponding predetermined portions of the lateral surface of a capsule (CX) of a further and different type able to be introduced into the machine (1) as well as to splay and pass beyond the inlet portions (41*a*, 45) of said jaws (41);
   said further coordinated gripping profiles (51) being shaped or arranged such that they are capable of defining, for the capsule (CX) of said further type, at least one corresponding retaining position in which the capsule (CX) of said further type is axially offset with respect to said predetermined reference direction (R-R).

2. The gripper retention device according to claim 1, wherein each jaw (41) has a gripping profile (50) and the further coordinated gripping profile (51) which are staggered with respect to one another at least along said predetermined reference direction (R-R).

3. The gripper retention device according to claim 2, wherein in each jaw (41) the gripping profile (50) and the further coordinated gripping profile (51) are integral with each other.

4. The gripper retention device according to claim 2, wherein in each jaw (41) the gripping profile (50) and the further gripping profile (51) are provided on portions (41*d*; 41*c*) of the jaw (41) which are movable relative to one another.

\* \* \* \* \*